Patented Apr. 16, 1940

2,197,319

UNITED STATES PATENT OFFICE 2,197,319

METHOD OF MANUFACTURING FOOD PRODUCTS

Earl O. Sargent, Des Moines, Iowa

No Drawing. Application September 22, 1938, Serial No. 231,197

2 Claims. (Cl. 99—6)

Manufacturers of stock feed have long recognized the food values for live stock present in so-called blackstrap molasses, and that it is not convenient to feed this molasses in its normal liquid condition.

Heretofore efforts have been made to mix said molasses with other food products having highly absorbent qualities, such, for instance, as corn oil cake meal, to thereby produce a commercially practicable stock feed containing a worthwhile proportion of said molasses and being of a nature which can be mixed, stored, shipped, handled and fed in a commercially practicable manner. These efforts have not proven successful for the reason that when a desirable proportion of said molasses was used, the resultant product was of such sticky adhesive nature as to prevent successful handling and feeding and when it dried it formed hard solid masses, and when the proportion of molasses was reduced to such an extent that it was absorbed by said meal and be capable of handling and feeding, then the proportion of molasses relative to the meal was so small as to be negligible so fas as a desirable stock feed was concerned.

The object of my invention is to provide a simple method which may be practiced with the use of the ordinary mixing, conveying, drying and sacking apparatus now in general use by stock feed manufacturing and whereby such meal is made to absorb several times its weight of said molasses and produce a product of dry granular form which will not become sticky or adhesive when exposed to high atmospheric temperatures or humidity and which may be mixed with other stock feed and which will be readily eaten by live stock and poultry, and whereby the well known beneficial effects of said molasses may be utilized in a stock feed in a simple, convenient and inexpensive manner.

At the present time I am manufacturing and selling the stock feed made by my new method. The apparatus I employ comprises a tank for the molasses, a tank for water, a stirring unit into which the molasses and water are mixed, a mixing unit to receive the mixed water and molasses and into which is slowly fed the meal, and a drying unit upon which the moist mixture is deposited in thin layers and oven dried, a grinder for breaking up the dried particles of the feed. All of this mechanism is in general use by stock feed manufacturers, hence, it is unnecessary to more specifically describe them.

The molasses which I am now using is known as blackstrap molasses and is the residual product from the manufacture of cane sugar and contains about fifty (50) per cent by weight of sugars.

The absorbent meal I am now using is known as corn oil meal cake and is the residual product from the extraction of corn oil from grains of corn. An example of the formula of this meal is as follows:

| | Per cent |
|---|---|
| Protein | 23 |
| Fat | ¾ of 1 |
| Carbohydrates | 63 |
| Nitrogen free extract | 51 |
| Fiber | 12½ |

Attention is directed to the almost complete absence of fat and to the stock feed values of the other ingredients.

In practicing my new method I run 250 lbs. of molasses in the stirrer and then slowly run 250 lbs. of water into the stirrer, and continuously operate the stirrer during the time that the water is being admitted.

An essential step in my new method is that prior to admitting the water into the stirrer the water must be chilled. In practice I reduce its temperature about 30° F. below that of the molasses. To illustrate, when the molasses is at room temperature, about 75° F., I chill the water to about 45° F. By the term "room temperature" as used in this application I mean such temperature in which the operators normally work from about 65° F. to 100° F. The reason for said minimum temperature is that the temperature of the molasses must be about 30° F. higher than that of the chilled water, which, of course, must be above the freezing point.

The combined molasses and water are then pumped to the mixing machine and the meal is slowly fed into the operation of the mixing machine. At the present time I use 100 lbs. of said meal and mix it into the said 500 lbs. of molasses and water. In about ten minutes of mixing substantially all of the molasses and water are absorbed by the meal, which is then in the nature of a plastic mass, a handful of this product may be picked up and squeezed without pressing out any liquid. The product is then rolled out into thin sheets and passed through a drying oven. When dried, the product is in a relatively caked condition and these cakes are then passed through rollers or presses and a finely divided dry granular product results. This product is then sacked, shipped and handled in the ordinary manner, and I have placed it in burlap sacks and exposed it to extreme atmospheric temperatures and humidities for long periods of time, and found that it remained in dry granular form.

The product may be fed to live stock or poultry in its finished form or mixed with the stock feed, is readily eaten and the feeder is thereby enabled to supply to the live stock the exact proportion of molasses desired.

Prior to my present invention or discovery I made numerous attempts to cause the meal to absorb a large quantity of molasses and produce a feed that could be handled and shipped commercially. I attempted to thin the molasses and make it more permeable by applying heat which apparently made it thinner and freer flowing, but the best result I could obtain was to cause the meal to absorb molasses in the amount of about 10% of the weight of the meal, and that amount was of no appreciable feed value.

In my experiment I found that when the proportion of molasses relative to the meal was increased to the point where it had a substantial feed value, then after the molasses was mixed with the meal it was of such sticky and adhesive nature as to make it impractical to handle, ship and feed. The difficulty obviously was that the sticky viscous nature of the molasses caused it to become deposited upon the surfaces of the meal particles and seal the pores thereof and thereby prevent the meal from absorbing the molasses. I tried adding more or less water to the molasses before stirring in the meal but was unable to cause the meal to absorb any greater proportion of molasses than the before mentioned percentage.

I have successfully solved these difficulties by the simple step in method of chilling the water before stirring it into the molasses and then mixing the meal with this liquid. This step of chilling the water produces the result of increasing the permeability of the molasses into the meal to a remarkable degree. In practice about 250 lbs. of molasses are being absorbed by 100 lbs. of the meal.

In addition to this the amount of molasses deposited upon the surfaces of the meal particles is so negligible that the mass before drying is not objectionably sticky and may be handled and worked with various implements without adhering thereto to an objectionable extent.

So far as I have been able to ascertain there is no chemical change in the ingredients caused by the practice of my method. The chill apparently operates to destroy or reduce the adhesive properties of the minute particles of the molasses so that they may separate in the water into minute particles small enough to penetrate into the pores or interstices of the meal as distinguished from masses held together by adhesion and thereby made incapable of entering the meal.

I find in practice that when the meal particles have absorbed the molasses particles and the product then dried, the molasses becomes fixed in the meal and has no tendency to separate therefrom under conditions to which it is likely to be subjected to in ordinary use.

My improved method may be practiced with other residual products containing sugar, such for instance as the residual product from the manufacture of beet sugar, or with a solution of sugar, maple syrup, honey, saccharin, etc.

As a substitute for the corn oil cake meal, similar results are obtained by the use of the residual product from the extraction of flax oil, soy beans, peat, finely divided cane stalks, etc.

Many other finely divided porous vegetable products which of themselves are suitable for stock feeding may be used.

I claim as my invention:

1. The method of manufacturing stock feed, which consists in mixing approximately two and one-half parts of blackstrap molasses in liquid form and at normal atmospheric temperature, with approximately two and one-half parts of water previously chilled to approximately thirty degrees Fahrenheit lower than the temperature of the molasses, then adding approximately one part of corn oil cake meal and stirring same until substantially all of said liquids are absorbed in said meal, then oven drying the resultant product and finally pulverizing same.

2. In the manufacture of stock feed, the method of treating blackstrap molasses whereby relatively large quantities thereof may be caused to be absorbed into finely divided porous vegetable feed ingredients with such minimum adsorption upon the surfaces of the vegetable feed ingredients that the resultant product when dried and finely divided, will not become sticky or adhesive when being used in the ordinary manner of a stock food, which method consists in providing substantially equal parts of blackstrap molasses and water, stirring them together and subjecting the molasses to a chilling action by previously reducing the temperature of the water to not less than thirty degrees F. lower than the temperature of the molasses to decrease its fluidity and increase its permeability, and then adding finely divided porous particles of a vegetable food ingredient, in an amount substantially less by weight than said molasses ingredient.

EARL O. SARGENT.